(12) United States Patent
Price et al.

(10) Patent No.: US 6,821,597 B1
(45) Date of Patent: Nov. 23, 2004

(54) METHOD FOR MANUFACTURING A SOUND INSULATING STRUCTURE AND THE STRUCTURE PRODUCED THEREBY

(75) Inventors: Burton J. Price, Bloomsburg, PA (US); G. Michael Whitaker, Bloomsburg, PA (US); Kurt Alan Kniss, Lewisburg, PA (US)

(73) Assignee: Magee Rieter Automotive Systems, Bloomsburg, PA (US)

( * ) Notice: Subject to any disclaimer, the term of this patent is extended or adjusted under 35 U.S.C. 154(b) by 0 days.

(21) Appl. No.: 09/266,155

(22) Filed: Mar. 10, 1999

(51) Int. Cl.⁷ .......................... B32B 33/00; D05C 17/02
(52) U.S. Cl. ........................ 428/95; 428/96; 428/97
(58) Field of Search ........................ 428/97, 95, 96

(56) References Cited

U.S. PATENT DOCUMENTS

| | | | |
|---|---|---|---|
| 4,112,161 A | * 9/1978 | Sorrells ................... 428/95 |
| 4,199,634 A | 4/1980 | Pole et al. |
| 4,508,774 A | 4/1985 | Grabhoefer et al. ........ 428/220 |
| 4,579,764 A | 4/1986 | Peoples, Jr. et al. |
| 4,584,232 A | 4/1986 | Frank et al. |
| 4,661,380 A | * 4/1987 | Tillotson ................ 427/207.1 |
| 4,715,473 A | 12/1987 | Tschudin-Mahrer |
| 4,741,945 A | 5/1988 | Brant et al. ................ 428/158 |
| 5,334,338 A | 8/1994 | Kittel et al. .............. 264/46.4 |
| 5,855,981 A | 1/1999 | Zegler et al. |
| 5,858,159 A | 1/1999 | Holbrook et al. .......... 156/256 |

FOREIGN PATENT DOCUMENTS

| | | |
|---|---|---|
| WO | WO9746423 | 12/1997 |
| WO | WO9818656 | 5/1998 |
| WO | WO9818657 | 5/1998 |
| WO | WO9837541 | 8/1998 |
| WO | WO9846456 | 10/1998 |
| WO | WO98/50905 | 11/1998 |

OTHER PUBLICATIONS

J. Levinstein, The Complete Carpet Manual, 1992, Library Research Associates Inc., p. 353.*

* cited by examiner

*Primary Examiner*—Cheryl A. Juska
(74) *Attorney, Agent, or Firm*—Volpe and Koenig, P.C.

(57) ABSTRACT

The present invention provides a sound insulating structure cover panel that compliments the sound attenuation material. The method of manufacturing the panel comprises the steps of providing a laminated blank having an interior face which will be observable from the passenger compartment. The side opposite the interior face of the blank has a generally non-permeable polymeric layer adjacent to a primary backing and a secondary backing layer overlying the polymeric layer. In the preferred process, the previously described blank is elevated to a desired temperature and positioned in a closed forming mold such that the perimeter of the blank is retained in a fixed position. The forming mold is closed with a controlled pressure that is sufficient to expand the blank, conform it to the mold and render a panel having a desired permeable.

9 Claims, 4 Drawing Sheets

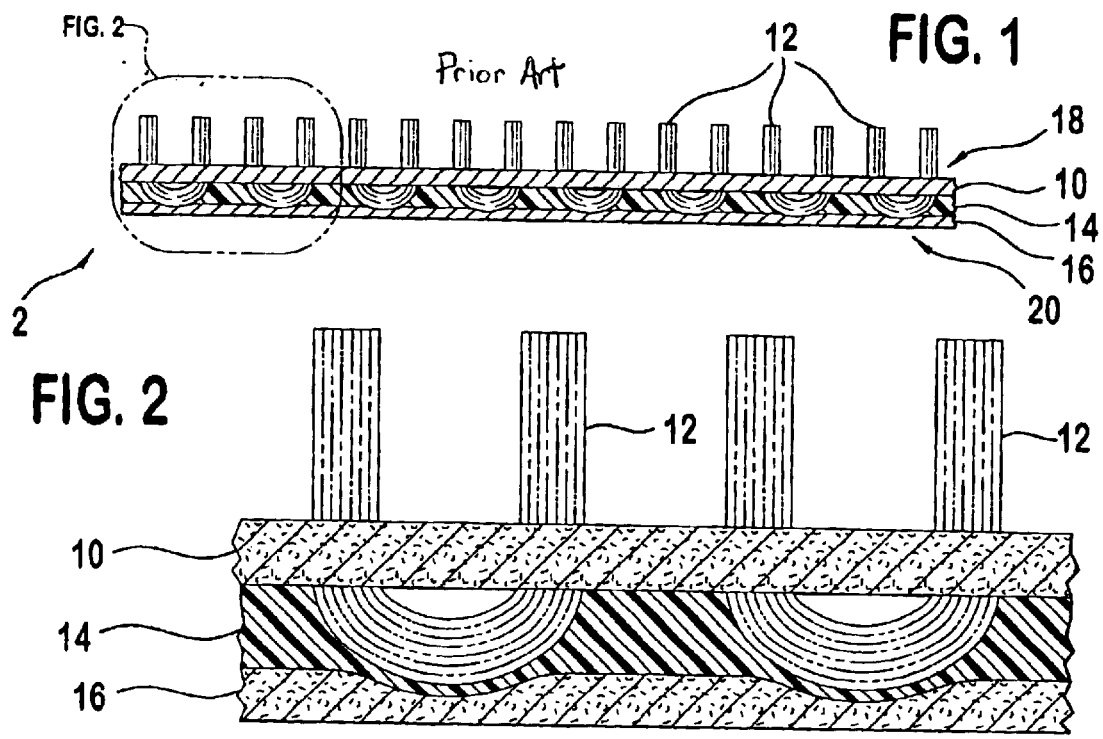
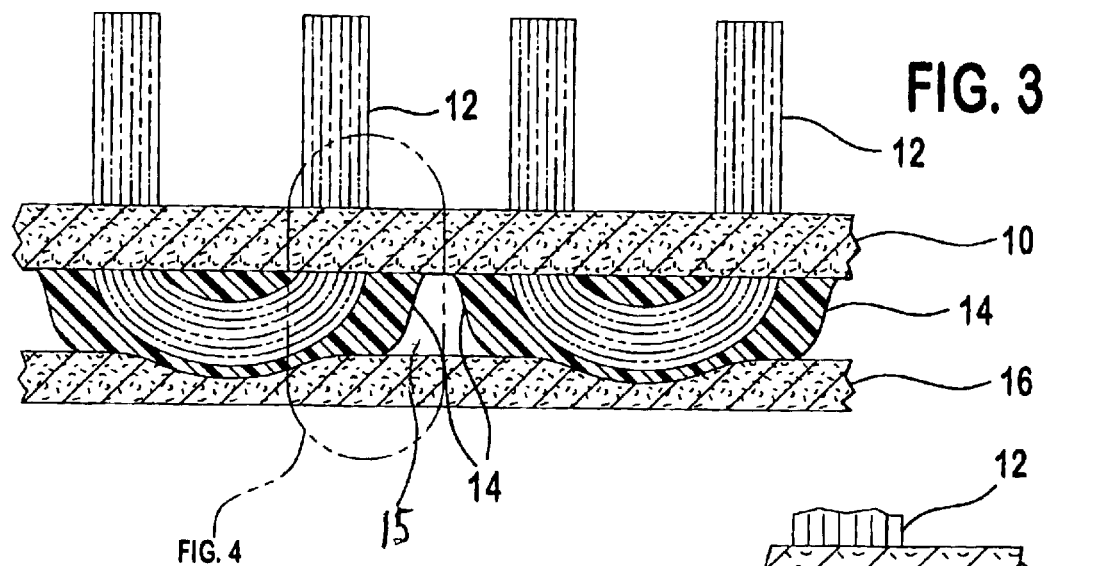
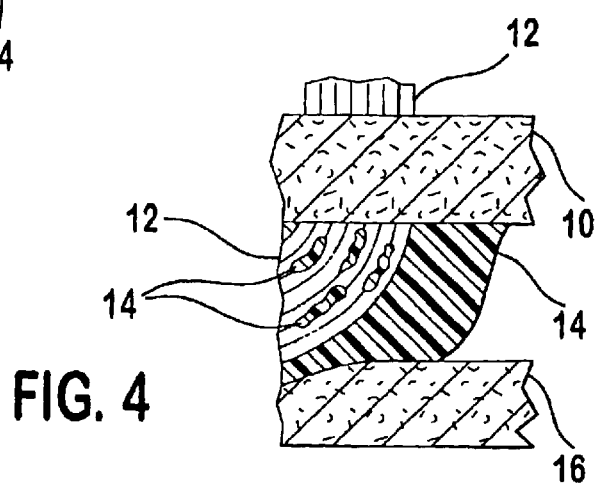

US 6,821,597 B1

METHOD FOR MANUFACTURING A SOUND INSULATING STRUCTURE AND THE STRUCTURE PRODUCED THEREBY

BACKGROUND OF INVENTION

1. Field of the Invention

The present invention generally relates to trim panels used to cover the interior surfaces of a vehicle. The invention more particularly relates to panels used to cover the interior surfaces of a passenger vehicle where sound attenuation is desired. The invention most particularly relates to panels which are used in passenger vehicles where appearance and sound attenuation are required. Such panels are employed as the head liners, wall liners and carpets of a vehicle for the purpose of improving appearance, temperature and sound control while enhancing the passengers' driving pleasure.

2. Description of the Prior Art

The use of trim panels and carpet panels to provide passenger comfort are well known in the art. For example, see U.S. Pat. Nos. 4,741,945; 4,508,774; and 5,334,338. In addition, the use of these known manufacturing techniques employed by the present invention for producing standard floor covering is also known. See U.S. Pat. No. 5,855,981.

Early efforts at sound attenuation in vehicles generally relied upon heavy, dense materials which would resist the entry of exterior noises into the passenger cabin. However, experience with such materials led to concerns about the transmission of vehicle vibrations and other sounds based upon the heavy insulating materials. Accordingly, the art has recently considered the use of ultralight, multifunctional, sound-insulating materials. For example, see WO 98/18656 and WO 98/18657.

More recently, it has been determined that ultralight, multifunctional, sound-insulating materials may not achieve their full benefit when used with exterior cover materials that do not compliment their function. Accordingly, the art desired an exterior or decorative cover material which permitted controlled sound transmission to the interior of the vehicle. It has been theorized that permitting transmission of some sound into the cabin will result in sound cancellation and a more pleasing passenger environment. As a result of the more pleasing environment, the use of ultralight materials will be greatly enhanced and a reduction in vehicle weight will be recognized without any decrease in cabin comfort.

SUMMARY OF THE INVENTION

The present invention provides a sound insulating structure cover panel that compliments the sound attenuation material. The method of manufacturing the panel comprises the steps of providing a laminated blank having an interior face which will be observable from the passenger compartment. The side opposite the interior face of the blank has a generally non-permeable polymeric layer adjacent to a primary backing and a secondary backing layer overlying the polymeric layer. In the preferred process, the previously described blank is elevated to a desired temperature and positioned in a closed forming mold such that the perimeter of the blank is retained in a fixed position. The forming mold is closed with a controlled pressure that is sufficient to expand the blank, conform it to the mold and render a panel having a desired permeable. Preferably, the post formation panel has a permeability of 500 rayls or less as measured on concentric airflow resistance equipment (C.A.R.E. unit) available from Rieter Automotive North America, Inc. 38555 Hills Tech Drive, Farmington Hills, Mich. 48331.

BRIEF DESCRIPTION OF THE DRAWINGS

FIG. 1 illustrates a known carpet construction which is suitable for use with the present invention.

FIG. 2 is an enlargement of the construction within the phantom lines of FIG. 1.

FIG. 3 is an enlargement, similar to FIG. 2, showing the wicking-in of the polymeric layer in the construction of the present invention as described in the exemplary embodiment of FIG. 1.

FIG. 4 illustrates the wicking-in of FIG. 3 within the tufts of yarn.

DETAILED DESCRIPTION OF THE INVENTION

Figure 5:
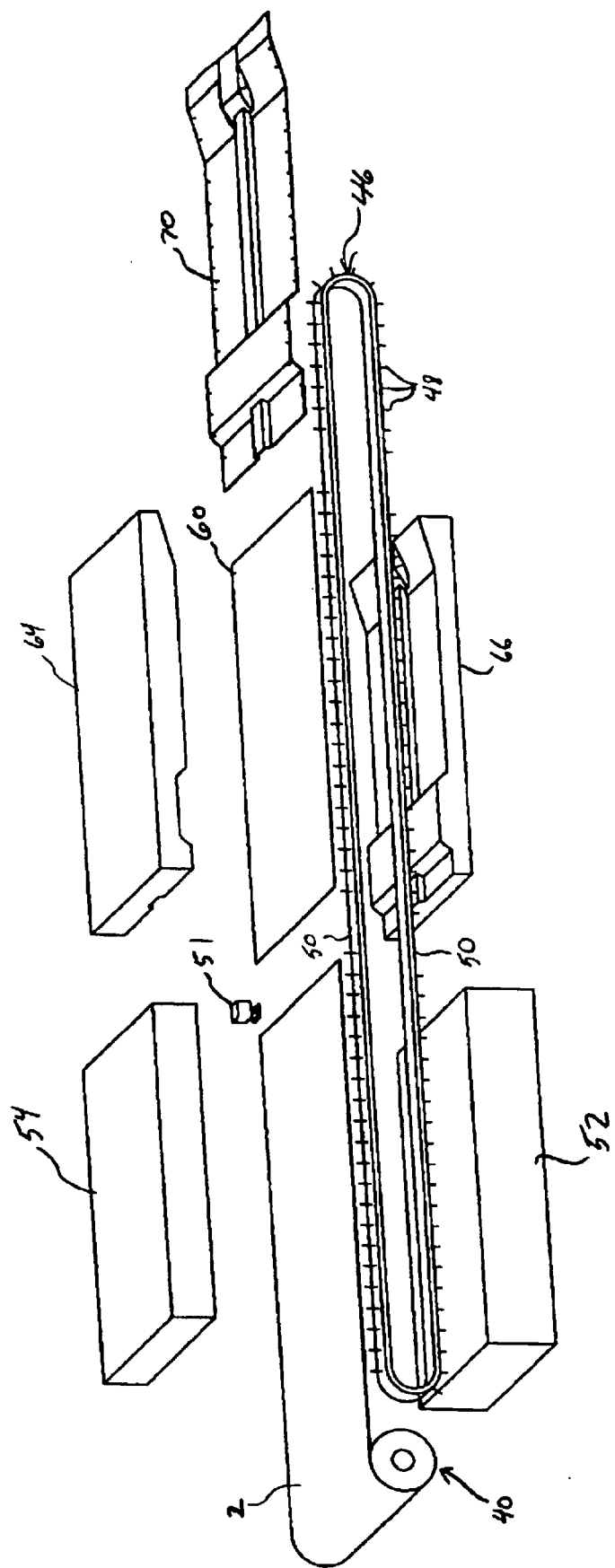
FIG. 5 illustrates a continuous operation for stretching and molding a panel in accordance with the present invention.

The invention will be described with reference to the drawing figures wherein like numbers indicate like elements throughout. It will be appreciated by those skilled in the art that the drawing figures are not to scale and liberties have been taken to permit illustration of the invention.

With reference to FIG. 1, there is shown a material blank 2 wherein a backing layer 10, of woven or non-woven construction, is used as a support base for a plurality of yarn tufts 12. Each of the yarn tufts 12 is comprised of a plurality of yarns in either a spun or filament construction. After the insertion of tufts 12 into the backing 10, the tufted assembly may be subjected to color and finishing operations before an extrusion coating process which places a polymeric layer 14 on the underside thereof. Finally, a backing layer 16, generally a porous, non-woven material, is applied to the polymeric layer 14. This construction will be known to those in the art. As a result of this construction, the resulting laminate will have a face surface 18 which will be the interior surface and a backing surface 20 which will be the exterior surface. For use in the automotive industry, the laminated material is cut into a blank that is subjected to a molding process for producing a post formation panel of a desired geometry in accordance with the vehicle body geometry. Such a construction is known to those skilled in the art and does not form any part of the present invention.

Although the above-described construction of the laminate and the panels are known to those skilled in the art, the present invention differs from the known constructions in the selection of materials for polymeric layer 14 and the post formation process parameters used to form the panels. In keeping with the present invention, the polymeric layer 14 is comprised of a high melt flow polymer which will provide the desired response to the subsequent processing in accordance with the invention. Test materials and panels used to demonstrate the present invention are described below.

The tufted assemblies used for testing were produced by tufting continuous filament yarns of 1400 denier or 1405 denier BCF nylon yarns into non-woven primary backing substrates of 120 g/m²–140 g/m² polyester fiber. If desired, spun or other yarn constructions may be used. Tufting machine gauges of ⅛ gauge and ⅒ gauge have been evaluated. It will be recognized by those skilled in the art that machine gauge stitches per inch and stitch pile height combine to determine the overall carpet construction and density. The number of penetrations per square inch is a factor in determining the available porosity and the wicking-in ability of the construction. The available porosity is an important aspect of the invention because the final product of the preferred embodiment must meet the aesthetic and durability standards set by the vehicle manufacturer. As the construction is altered, the percentage of expansion to achieve the desired post formation product may need to be modified.

The tufted assemblies of the tests were extrusion coated, using known techniques, with a low density polyethylene coating 14 and laminated with a light weight secondary non-woven polyester substrate. A polyethylene coating 14, of AT 193, available from A. T. Plastic, Inc. of Ontario, Canada, applied between 375–400 g/m² has been used successfully with a known 13–17 g/m² secondary polyester substrate 16.

The secondary substrate 16 is laminated directly to the polyethylene 14 using a standard nip roll, in accordance with prior practices. The temperature of the polyethylene extruding from the die is approximately 400° F. The nip pressure, for a laminate of approximately 0.250 inches, at the rolls was approximately 50 pounds per linear inch and the nip setting was approximately 0.030 inches. The chill roll temperature was in the range of 55–70° F., and the process line speed varied between 25–40 FPM. At this point, the laminated material was either rolled up or cut into blanks in preparation for the molding operation. Although this laminated material is still non-permeable, it is correctly prepared for the subsequent process which will render it permeable.

In order to form a finished panel, a specific blank size was cut and heated prior to molding. Through reheating of the carpet laminate, the polymeric layer 14 begins wetting out or wicking-in, see FIGS. 3 and 4. This causes the polymeric layer 14 to flow into the tufts 12 and creates voids 15 between the tufts 12. This is the beginning of the transformation from a non-permeable to a permeable laminate. The voids 15 that are formed in the polymeric layer 14 result in the laminate being permeable. The transformation to the desired permeability was achieved by stretching, molding and curing the heated laminate.

Heating of the material 2 for 25–30 seconds under a heat intensity of 10 to 15 watts per square inch of material has been found to provide a satisfactory temperature elevation with the test material. By heating the back surface 20 to a temperature between 325–350° F., the polymeric layer 14 can be worked without causing melt flow or a loss of adhesion. The heated blank was molded in a chilled molding tool at approximately 1.5 to 4.0 PSI of mold pressure and 45° F. The approximate cool down time in the molding tool was forty-five (45) seconds. In the test material, these conditions produced a controlled stretch of seven to ten percent (7–10%) of the blank size. Upon removal from the mold, a face panel with the desired air permeability had been produced.

Figure 7:
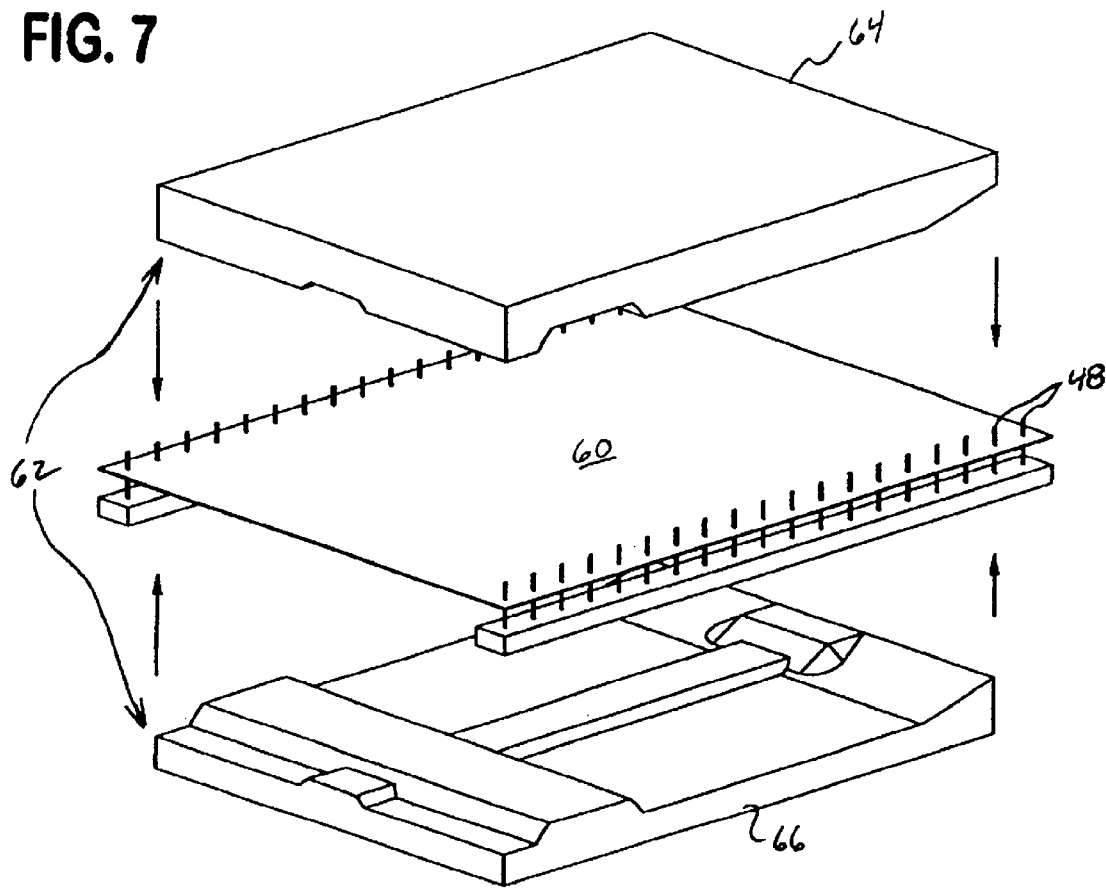
FIG. 7 illustrates a mold assembly in accordance with the invention.
Figure 8:
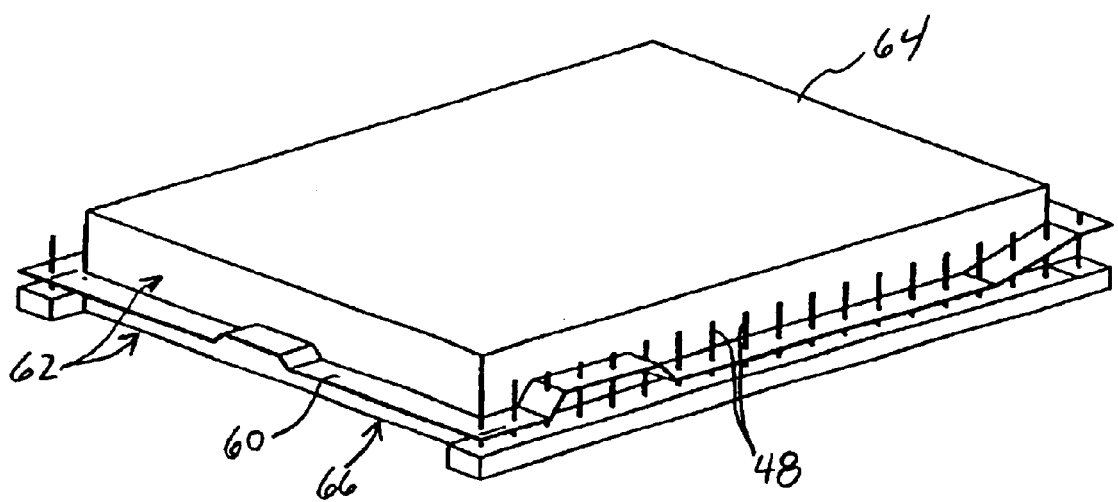
FIG. 8 illustrates a panel in the final molding and cooling stage.
Figure 9:
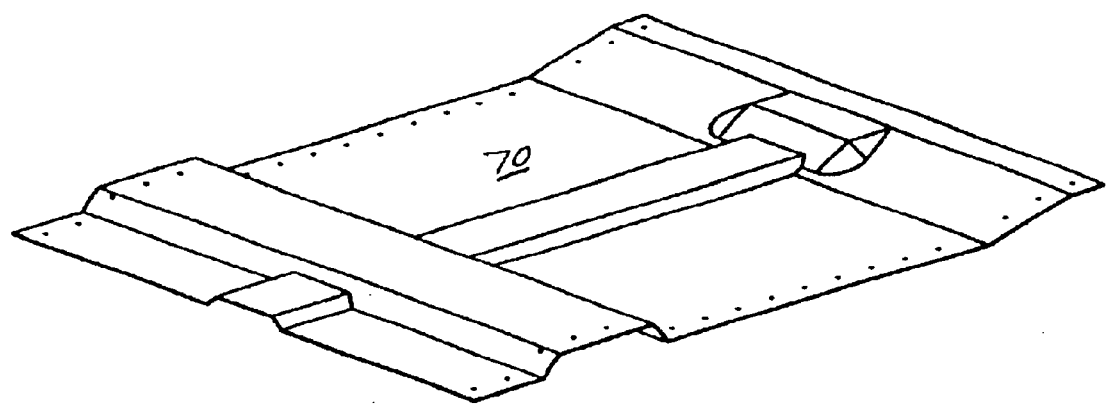
FIG. 9 illustrates a molded and cooled panel prior to trimming.

With reference to FIGS. 5 through 9, the manufacturing process, as used to produce test samples and as envisioned for production quantities, will be described. As illustrated in FIG. 5, the material moves from a supply roll to a heating table (FIG. 6) through a mold (FIGS. 7 and 8) and is off loaded or further processed as a panel (FIG. 9).

Figure 6:
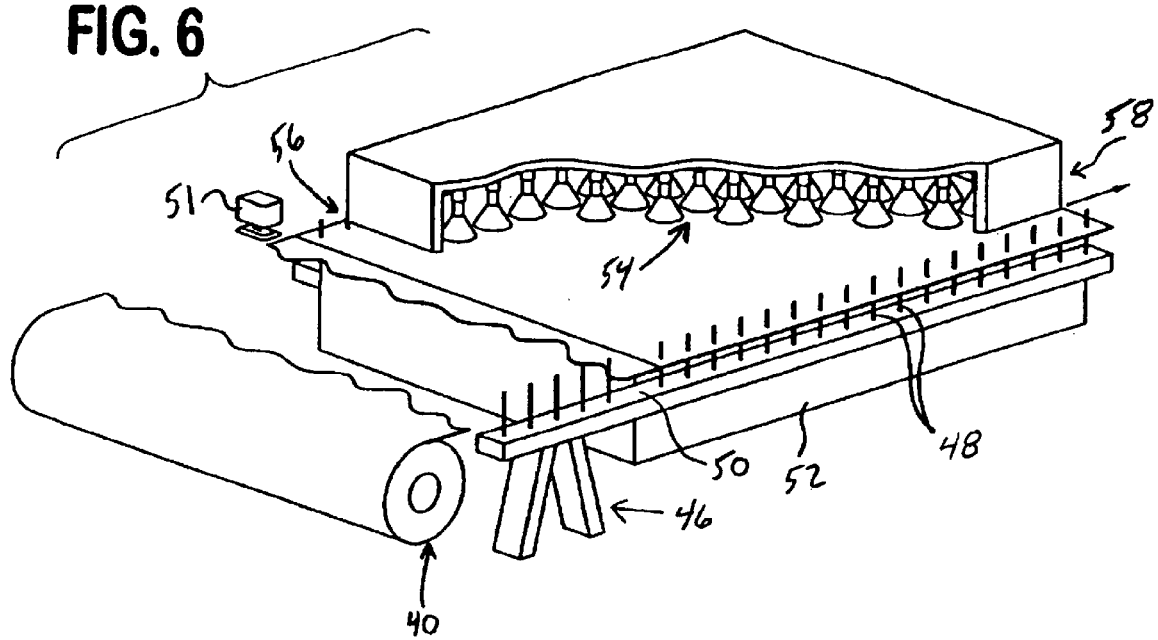
FIG. 6 illustrates a heating table for use with a preferred manufacturing process.

In FIGS. 5 and 6, a supply roll 40 of laminated blank material 2 is secured to a tenter frame 46 which has material retaining means 48 spaced in accordance with the desired blank perimeter. The retainer means 48 may be pins, clips or other holding means to grip the material and establish the length and width of the blank. They preferably are adjustable or removable to provide a cutting gap 50 where a transverse cutter 51 can cut the blank from the supply roll 40. The blank passes over the heating table 52 beneath a plurality of heating elements 54 which are selected in accordance with the construction of the laminated blank material 2 so as to achieve the desired temperature. It is expected that the elements at the entrance 56 will be selected to rapidly elevate the temperature while the elements at the exit 58 will be selected to achieve equalization at a desired temperature.

In FIG. 7, the heated panel 60 is presented to the refrigerated mold 62 which has a movable, pressure applying half 64 and a stationary refrigerated half 66. While being held by the retainers 48, the blank 60 is aligned over the mold as it is closed at the desired pressure to stretch the generally planar blank 60 over the contour of the mold. It will be recognized by those skilled in the art that the mold 62 is configured, in both halves 64 and 66, to the geometry of the vehicles floor board. When the mold 62 is finally closed, as illustrated in FIG. 8, the blank 60 might be repositioned in the mold 62, however, the original perimeter of the blank will remain substantially unchanged. After the molded panel 70 is released from the mold, FIG. 9, it may continue to a subsequent processing operation as described hereinafter, or the perimeter may be trimmed to provide a finished and cut to size molded panel.

The test samples produced for this invention were made with the use of piece goods that were presented to the heating table and molded through a hand operation. In this operation, the heated blank was manually placed over a stationary tenter frame adjacent to the mold and the mold was manually emptied when the stretching and molding operation had been completed.

Permeability of the test samples was established by using a C.A.R.E. unit. On average, three readings were taken in four locations on each sample to establish that the panel had achieved the desired permeability. Generally, for automotive purposes, it is preferred to take the test reading in the flat of the foot wells or the base of the panel. In any event, it is preferred that the reading be taken in an area more representative of the mold extension. Thus, a flat portion directly over the tunnel may not be fairly representative. In addition to the above, the use of a well base also provides the practical advantage of being accessible and supportable. It is important to support the sample on a firm but open surface, such as a mesh table, that will not restrict air flow, so the test equipment can be applied firmly.

As noted previously, this invention was motivated by the desire to enhance the use of ultralight material as described in WO98/18656 and 2098/18657. The description of that material is incorporated herein as if fully set forth. In keeping with the effort to achieve the maximum benefits of this combination, the assembly of the panel 70 to the ultralight material will be described. Since the combined components must maintain the permeability of the entire sound insulation assembly within a specified range, they must be carefully adhered together. One acceptable adhesive is available from National Starch as item 34-3378 with a melt viscosity of 1500–2125 centapoise at an application temperature of approximately 400° F. An application of hot melt adhesive in the range of 7–9 gm/Ft.² has found to be successful in adhering the components while maintaining the desired permeability.

The adhesive which may be applied to either the carpet or the insulator, preferably, is in a randomized web. This randomized application assures adhesive bonding in all areas without restricting the permeability. The two components should be aligned for accuracy before bonding to prevent multiple positioning attempts which diminish the adhesion and disturb the permeability. The assembly press used to assure physical bonding of the components has preset stops which limit the forces on the components and prevents compression of the sound insulator beyond that needed for adhesion and maintains the assembly's permeability characteristics. Based on the test samples, the assembled components should be compressed, with a force that will not compress the ultralight material beyond its specified finished part thickness by more than 2 mm. This avoids a compression from which the ultralight material may not rebound.

It will be recognized by those skilled in the art that the automotive industry has specifications and test methods for product performance and durability that must be met by the product in the field. The panels produced in accordance with the present invention have met these product and test specifications.

We claim:

1. A laminar assembly comprised of:
    a backing with an exterior surface;
    a plurality of textile tufts embedded in the backing with a plurality of voids between the tufts and adjacent to the exterior surface; and
    a permeable polymeric material that: overlies at least part of the exterior surface of the backing; is wicked into the textile tufts; and has voids between the textile tufts;
    wherein the plurality of voids are formed in the assembly, which is preheated, and subsequently closed within a forming mold with controlled pressure sufficient for expanding the assembly to conform it to the mold.

2. The laminar assembly of claim 1 further comprising a secondary substrate disposed adjacent the polymeric material.

3. A laminated vehicle sound insulating carpet panel comprising:
    a backing layer having a plurality of textile tufts embedded therein to establish interior and exterior faces of the backing layer; and
    a layer of a permeable polymeric material disposed on the exterior face of the backing material, wherein the polymeric material is disposed in the plurality of textile tufts and defines a plurality of voids;
    wherein the shape of the panel corresponds to a predetermined shape of an interior surface of a motor vehicle; and
    wherein the plurality of voids are formed in the panel, which is preheated, and subsequently closed within a forming mold with controlled pressure sufficient for expanding the panel to conform it to the mold.

4. The carpet panel of claim 3 further including a secondary substrate disposed adjacent to the polymeric material.

5. The carpet panel of claim 4 wherein the permeability is measured by concentric airflow equipment.

6. A laminar textile assembly for use in a motor vehicle comprising:
    a backing layer having a plurality of textile tufts embedded therein to establish interior and exterior faces of the backing layer; and
    a layer of a polymeric material disposed on the exterior face of the backing material, wherein the polymeric material defines a plurality of voids between the plurality of textile tufts with portions of the polymeric material being disposed in textile tufts;
    wherein the plurality of voids are formed in the assembly, which is preheated, and subsequently closed within a forming mold with controlled pressure sufficient for expanding the assembly to conform it to the mold.

7. The laminar textile assembly of claim 6 further comprising a secondary substrate disposed adjacent to the polymeric material.

8. A three dimensional laminar assembly for use in a motor vehicle comprised of:
    a backing;
    a plurality of textile tufts embedded in the backing to define face and exterior surfaces and a plurality of voids between the tufts; and
    a polymeric material overlying the exterior surface and disposed in the textile tufts and the voids between the textile tufts;
    wherein the plurality of voids are formed in the assembly, which is preheated, and subsequently closed within a forming mold with controlled pressure sufficient for expanding the assembly to conform it to the mold.

9. A three dimensional sound insulating carpet panel for use in a motor vehicle comprising:
    a backing layer having a plurality of textile tufts embedded therein to establish interior and exterior faces of the backing layer and a plurality of voids among the plurality of textile tufts; and
    a layer of a polymeric material disposed on the exterior face of the backing material and in the plurality of textile tufts to define a plurality of voids between tufts;
    wherein the plurality of voids are formed in the panel, which is preheated, and subsequently closed within a forming mold with controlled pressure sufficient for expanding the panel to conform it to the mold.

* * * * *